No. 709,895. Patented Sept. 30, 1902.
W. FURLONG.
COTTON PLANTER.
(Application filed Feb. 10, 1902.)
(No Model.) 2 Sheets—Sheet I.
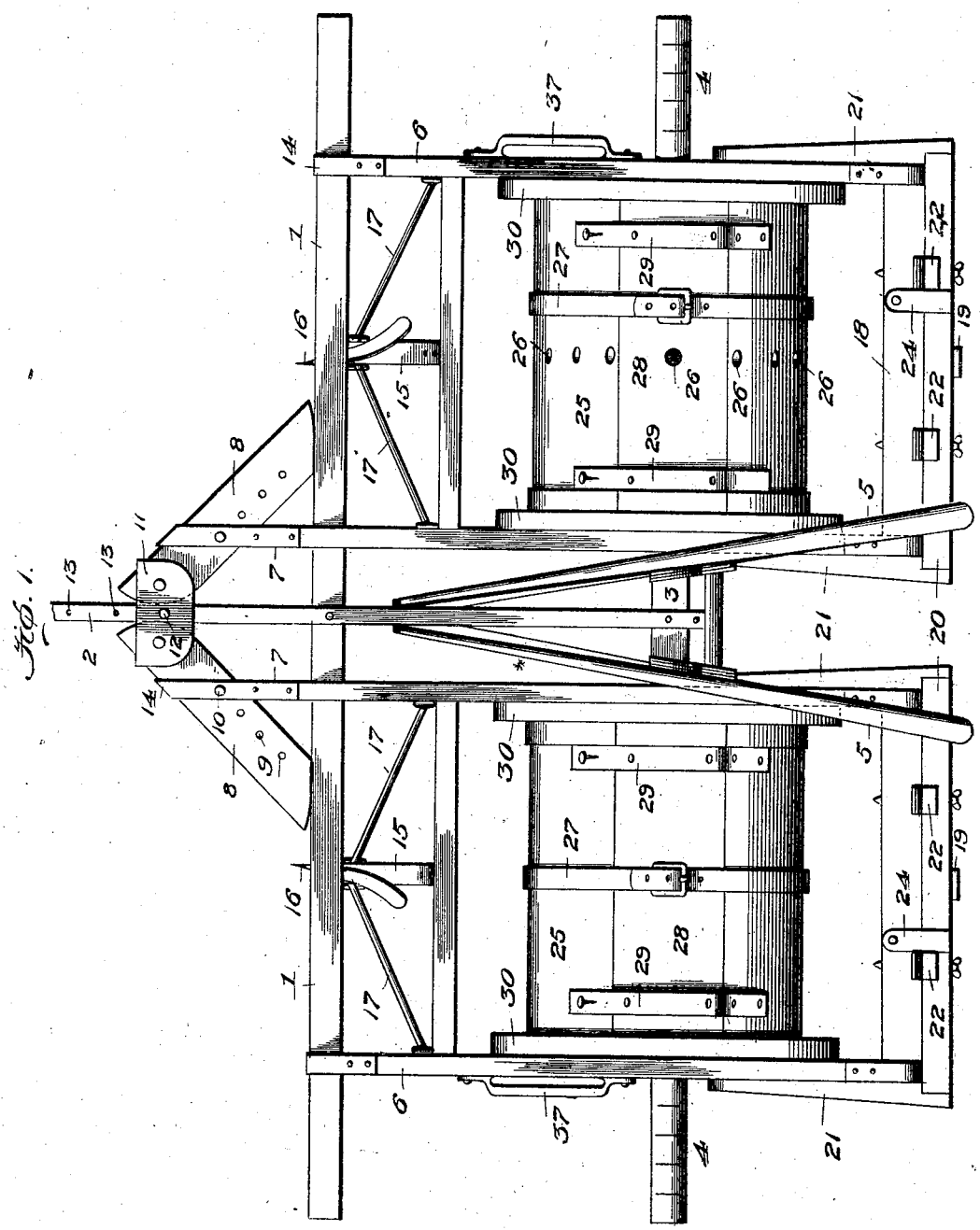

No. 709,895. Patented Sept. 30, 1902.
W. FURLONG.
COTTON PLANTER.
(Application filed Feb. 10, 1902.)
(No Model.) 2 Sheets—Sheet 2.
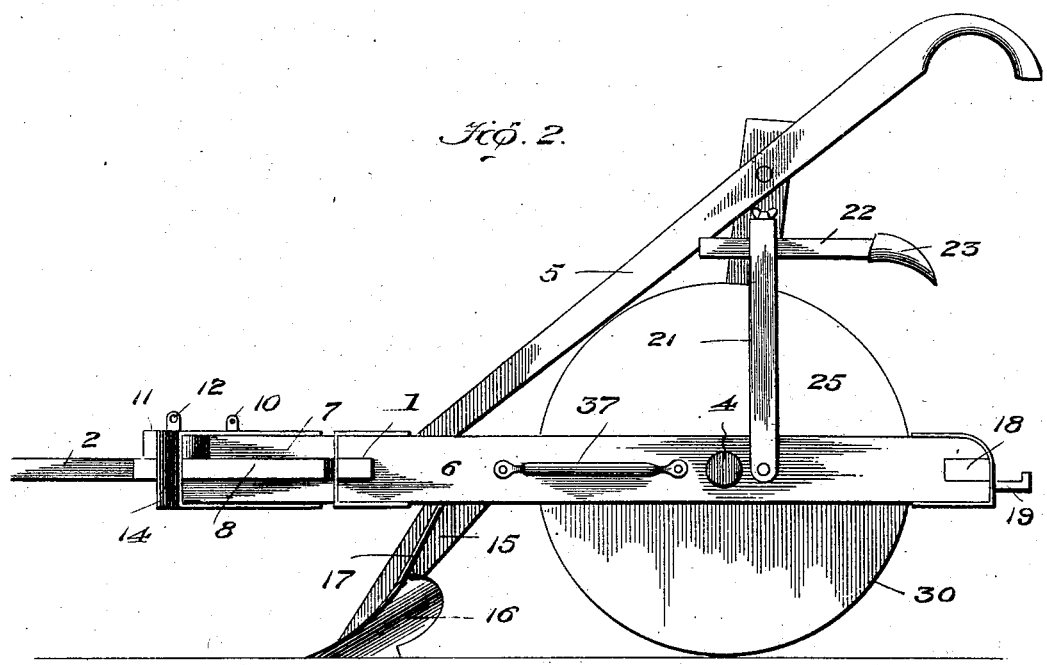
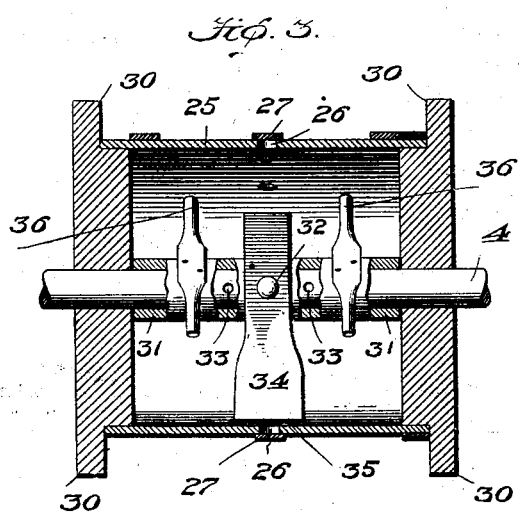
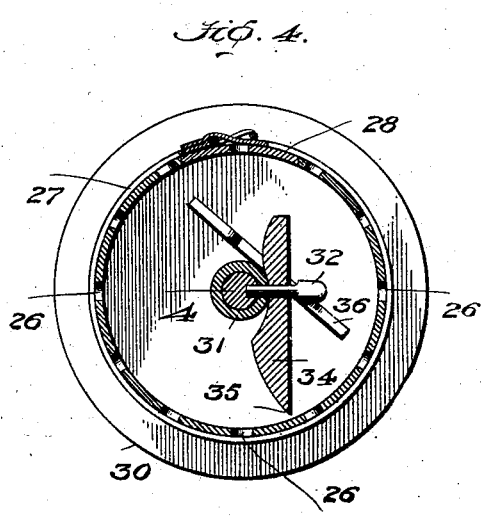
Witnesses Inventor
William Furlong
by O'Farrell & Lawson
Attorneys
THE NORRIS PETERS CO., PHOTO-LITHO., WASHINGTON, D. C.

UNITED STATES PATENT OFFICE.

WILLIAM FURLONG, OF MONROE COUNTY, MISSISSIPPI, ASSIGNOR OF TWO-THIRDS TO W. E. PARKER AND JULIUS FRANK, JR., OF MONROE COUNTY, MISSISSIPPI.

COTTON-PLANTER.

SPECIFICATION forming part of Letters Patent No. 709,895, dated September 30, 1902.

Application filed February 10, 1902. Serial No. 93,384. (No model.)

*To all whom it may concern:*

Be it known that I, WILLIAM FURLONG, a citizen of the United States, residing in the county of Monroe and State of Mississippi, have invented certain new and useful Improvements in Cotton-Planters, of which the following is a specification, reference being had therein to the accompanying drawings.

My invention relates to new and useful improvements in cotton-seed planters; and its object, among other things, is to provide a device adapted to plant the seed simultaneously in parallel rows. Another object is to employ seed containing and distributing receptacles of novel construction and to provide means for adjusting said receptacles from or toward each other, whereby the distance between the rows is regulated.

With these and other objects in view the invention consists in the novel construction and combination of parts hereinafter more fully described and claimed, and illustrated in the accompanying drawings, showing the preferred form of my invention, and in which—

Figure 1 is a plan view of the planter, showing one of the seed-receptacles arranged for distributing seed. Fig. 2 is a side elevation, showing the covering-shovels in raised position. Fig. 3 is a central longitudinal section through one of the seed-containing receptacles, and Fig. 4 is a vertical transverse section therethrough.

Referring to the figures by numerals of reference, 1 is a beam secured at right angles to a forwardly-projecting tongue 2, which is preferably connected at its rear end to the squared central portion 3 of an axle 4. Rearwardly-extending handles 5 are secured to the tongue and are provided to enable the operator to readily guide the device when in use.

Slidably mounted on the axle or shaft 4 and the cross-beam 1 are two similar preferably rectangular frames 6, the inner sides of which extend forward parallel with the tongue 2 and beyond the beam 1, as shown at 7. The outer ends of the sides 7 are forked, and each receives a link 8, having a series of apertures 9, any one of which is adapted to be engaged by a securing-pin 10 extending through the fork of the side 7. The links 8 are pivoted at their outer ends in a block 11, adjustably secured to the tongue 2 by means of a pin 12 engaging any one of a series of apertures 13 in said tongue. Straps 14 extend over the ends of the forks of the sides 7 and serve to prevent accidental displacement of the links 8.

Secured to the center of the forward end of each frame 6 is the stock 15 of a plow 16, and the same may be braced in any suitable manner, as by means of rod 17. Extending from the under surface of the rear end 18 of of each frame 6 are stop strips or rests 19, upon which normally bear beams 20. Arms 21 extend inward from the ends of these beams and are pivoted to the sides of the frames, as shown. The stocks 22 of shovels 23 are suitably secured to each beam, and said shovels are so arranged as to cover the seed with earth after they have once been deposited in the furrow made by the plow 16. A button 24 or other suitable means is employed for locking each beam 20 in position upon the stops 19 when it is desired to hold the shovels in operative position.

Revolubly mounted on the shaft 4 within each frame 6 is a drum 25, having a series of apertures 26 therein and extending around the center, as shown. These apertures may all be closed by means of a strap or hoop 27 encircling the drum. A door 28 is provided on each drum, whereby access to the interior may be readily obtained. These doors are secured to the drums by straps 29 or in other suitable manner. An annular flange or rim 30 is arranged at each end of the drums, and these serve as tires and hold the bodies of the drums and the straps thereon out of contact with the ground.

Mounted on the shaft 4 within each drum 25 is a sleeve 31. This sleeve is equal in length to the interior of the drum and is adjustably secured to the shaft 4 by means of a pin 32, adapted to engage any one of a series of recesses 33, formed in the shaft 4. A scraper 34 is secured to each sleeve 31, and the sharp edge 35 thereof is located close to the inner curved surface of the drum and across the line of apertures 26. Mixers 36 are also secured to the sleeve 31, preferably at an angle to the scraper.

A grip 37 is arranged on the outer side of each frame 6, and the fixed shaft 4 is graduated, as shown.

When it is desired to adjust the machine so as to plant the seed in rows at a desired distance apart, the pins 10 and 12 are removed, as are also pins 32. The frames 6 may then be grasped by grips 37 and slid either from or toward each other until they are properly located in relation to each other. The pins are then replaced and the machine is set for operation.

Seed is placed in the drums after opening the doors 28, and the straps 27 are removed from apertures 26. As the apertures 26 are directly in rear of the plows 16, it will be understood that the seed will be deposited within the furrow as the drums revolve. The shovels 23 following after will then cover the seed.

The mixers 36 agitate the seed in the drums and scraper 34 prevents clogging of the apertures.

By closing the apertures 26 and raising the shovels 23, as shown in Fig. 2, the device can be used solely for plowing.

It will be seen that the invention is extremely simple in construction. The novel arrangement of its parts renders the device effective and cheap to operate, reducing to one operation the plowing, planting, and covering of the cotton-seed. Moreover, it permits the planting of two rows at a time, said rows being arranged at desired distances apart.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I therefore claim as new, and desire to secure by Letters Patent, is—

The combination with a fixed axle and a cross-beam; of a tongue secured thereto, frames slidably mounted on the beam and axle, links adjustably connecting the tongue and frames, a drum in each frame and revolubly mounted on the axle, means in each drum for locking the frame against lateral movement on the axle, means for closing discharge-apertures in the drums, plows in advance of, and in alinement with the apertures in the drums, vertically-movable shovels secured to the frame in rear of the drums, and means for locking the shovels in operative position.

In testimony whereof I affix my signature in presence of two witnesses.

WILLIAM FURLONG.

Witnesses:
W. G. SYKES, Jr.,
JAS. A. LAWSON.